C. H. CLARK.
WHEEL HOE.
APPLICATION FILED SEPT. 25, 1917.
1,266,918.
Patented May 21, 1918.
3 SHEETS—SHEET 3.
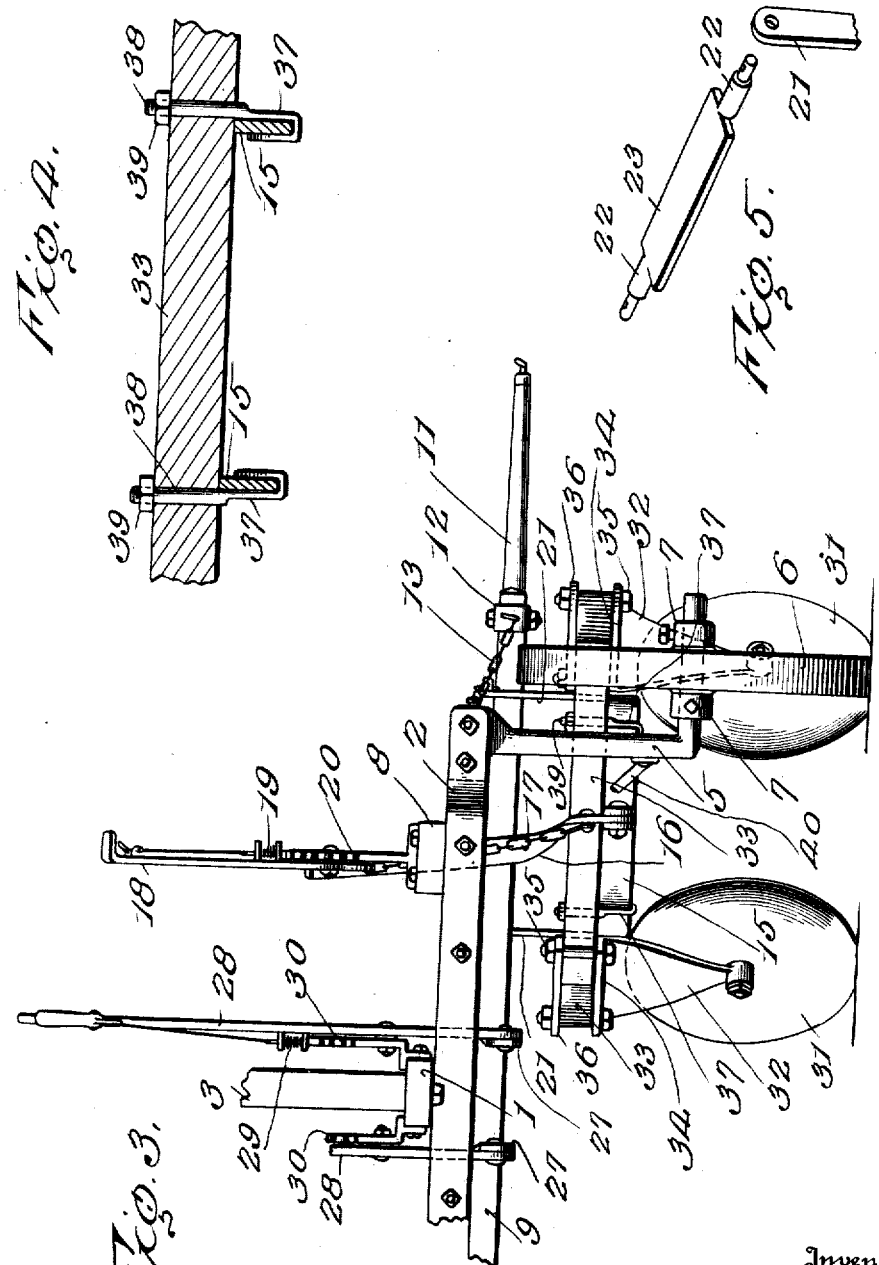

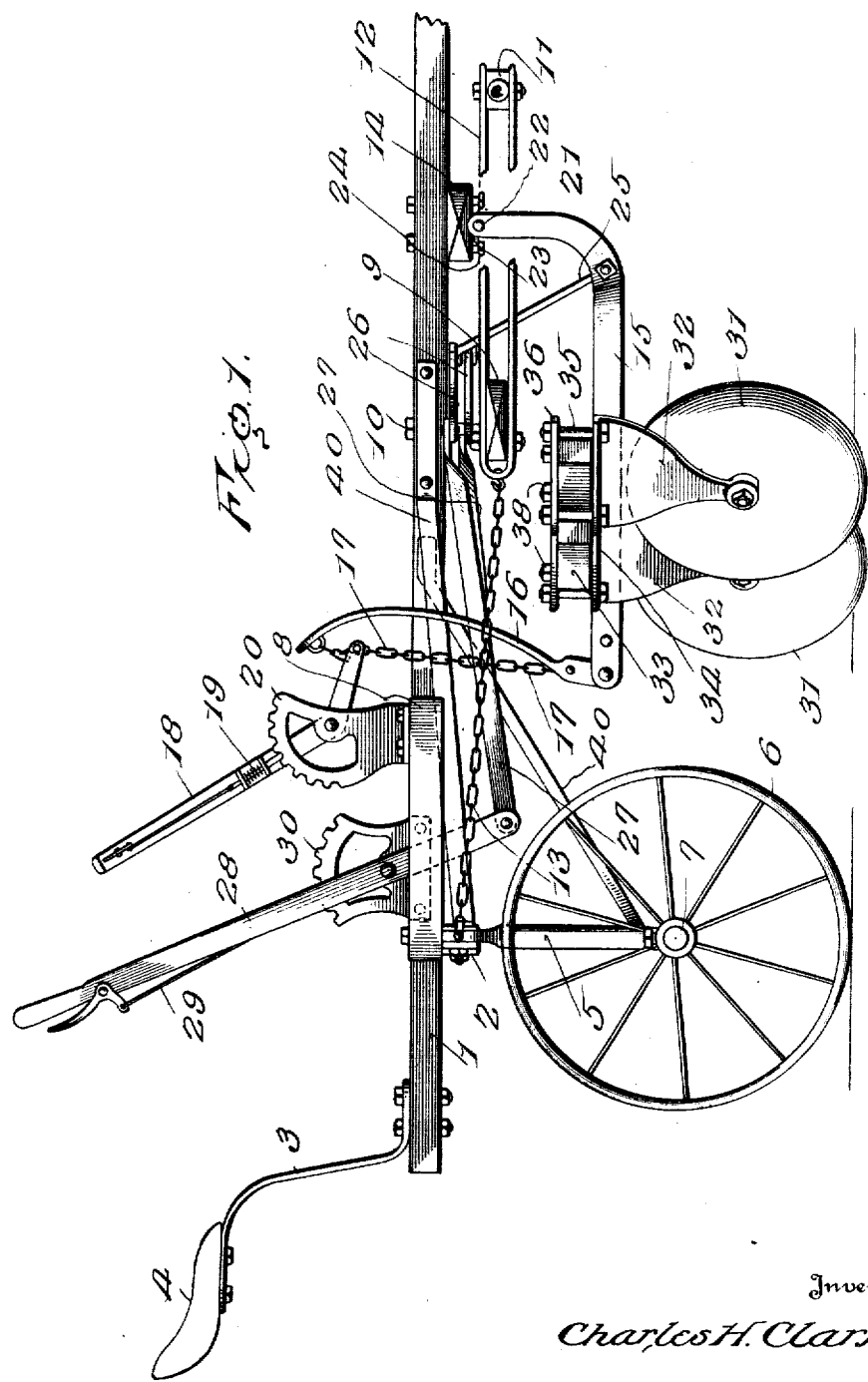

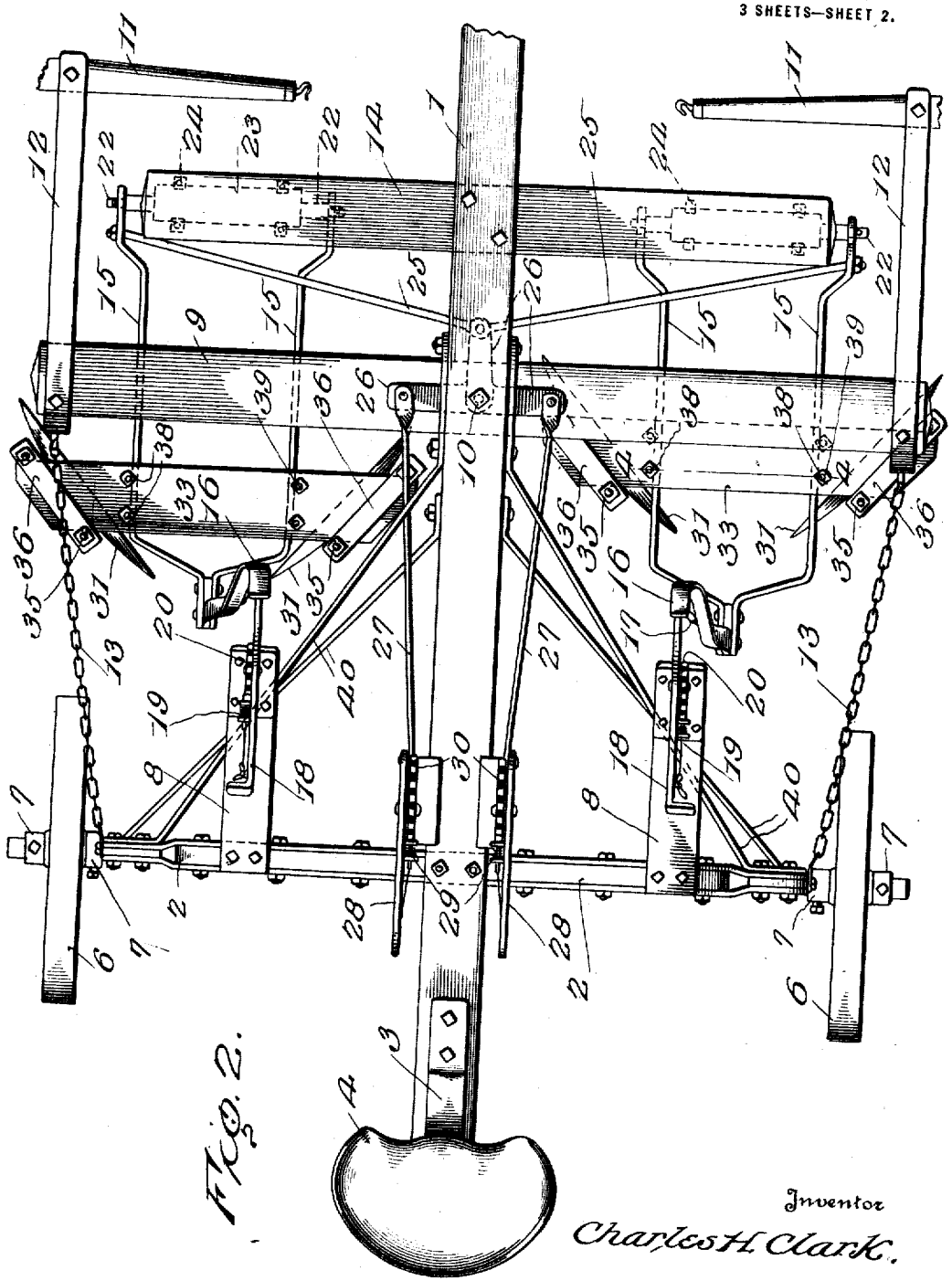

UNITED STATES PATENT OFFICE.

CHARLES H. CLARK, OF EASTON, MAINE.

WHEEL-HOE.

1,266,918.

Specification of Letters Patent. Patented May 21, 1918.

Application filed September 25, 1917. Serial No. 193,146.

*To all whom it may concern:*

Be it known that I, CHARLES H. CLARK, a citizen of the United States, residing at Easton, in the county of Aroostook and State of Maine, have invented certain new and useful Improvements in Wheeled Hoes, of which the following is a specification.

This invention relates to wheeled hoes or cultivators and has for its object the provision of simple, inexpensive and efficient means whereby the cultivator blades will be firmly supported from the main frame and may be readily adjusted to the width of the rows of plants. Other incidental objects of the invention will appear as the description of the same proceeds.

The invention is illustrated in the accompanying drawings in which:

Figure 1 is a side elevation of an apparatus embodying my improvements.

Fig. 2 is a plan view of the same.

Fig. 3 is a rear elevation of a portion of the apparatus.

Fig. 4 is a detail sectional view on the line 4—4 of Fig. 2.

Fig. 5 is a detail perspective view of a portion of the means for adjusting the blades to the space between the rows.

In carrying out my invention I employ a pole or tongue 1 which has its rear end secured to an axle frame 2 and supports a standard 3 upon which is carried a seat 4. To the ends of the axle frame 2, I secure the axle spindles 5 upon which ground wheels 6 are mounted so as to turn freely. Stop collars 7 disposed at the opposite sides of the hubs of the wheels are secured adjustably upon the axle spindles so that the wheels may be adjusted to the width of the rows. Between the center and the ends of the axle frame 2, I secure the forwardly projecting bars or brackets 8 which furnish supports for the adjusting levers for raising and lowering the cultivators and in advance of said brackets I provide a cross beam 9 to the ends of which the draft devices are connected. This cross bar or beam 9 may be supported from the tongue by a bolt 10 inserted therethrough and the whiffletrees 11 are secured in the front ends of bails 12 secured upon the ends of the cross bar and projecting forwardly therefrom. Chains or other flexible connections 13 serve to connect the ends of the cross bar 9 with the ends of the axle frame and thereby check the forward movement of said beam so that the draft will be applied to the axle frame and the machine drawn forward. At a point in advance of the cross bar 9, I rigidly secure to the pole or tongue 1 a cross bar or beam 14 at the ends of which the cultivator frames are supported.

The cultivator frames consist of side bars 15 which are disposed in parallel relation and have their rear ends brought together to be secured to the lower end of a spring 16 and a chain 17 which are connected with the lower forward end of a lever 18 mounted upon the front end of a bracket 8 and equipped with the usual latch 19 engaging a segment or rack 20, whereby the lever will be maintained in a set position. The chain and spring serve to support the rear end of the cultivator frame which consists of the side bars 15 so that the disks may be permitted to penetrate the soil to any desired depth or may be held raised clear of the soil, as may be desired. The front ends of the said bars 15 are turned upwardly as shown at 21, and are fitted upon the pins or trunnions 22 at the ends of the plates 23 which are slidably mounted on the under side of the cross bar 14 at the ends thereof. The particular manner of supporting the slidable plates 23 is immaterial and I have illustrated bolts 24 passing through the beam 14 and carrying a supporting plate or clip which passes beneath the slide. The bolts will engage or bear against the edges of the slide and will thereby guide it in its movements. To the outer upturned portion 21 of the cultivator frame I secure a link or connecting rod 25 which extends inwardly from the cultivator frame and has its inner end pivoted to the forward end of an angle lever 26 which is fulcrumed at its angle upon the bolt 10 and has one arm extending forwardly therefrom and its other arm extending laterally or outwardly therefrom. To the free end of the outwardly extending arm I pivot the front end of a bar 27 which extends rearwardly and has its rear end pivoted to the lower end of a hand lever 28 suitably fulcrumed upon the pole or tongue immediately in front of the axle frame and equipped with the usual latch frame engaging a segment or rack 30 so as to hold the lever in a set position. This arrangement is duplicated at each side of the pole and it will be readily understood that by swinging the lever 28 forward the connecting bar 27 will be drawn rearwardly and consequently the angle lever turned about its pivot so as to move the link 25 outwardly and thereby set the cultivators at a greater distance from the pole. Movement of the lever 28 in the opposite direction will, of course, bring the cultivators nearer the pole and the machine can thus be readily adjusted to correspond to the width of the rows or the space between them.

The cultivator disks 31 are rotatably mounted at the lower ends of standards 32 which extend up to a cross bar 33 and have their upper ends constructed with lateral flanges 34 bearing against the under side of said cross bar. Bolts 35 are inserted through the flanges 34 at the front and rear of the cross bar 33 and also pass through clip plates 36 bearing upon the top of said cross bar so that the standards may be readily clamped to the bar and hold the cultivator disks at any desired angle and at any desired distance apart. The cross bar 33 rests upon the side bars 15 of the cultivator frame and may be secured at any point along said side bars by the hooks 37 engaging under the bars 15 and provided with threaded shanks 38 extending up through the cross bar and equipped with securing nuts 39 bearing upon the upper side of the same.

Braces 40 extend between and are secured to the sides of the pole and the axle and the upper braces support the front ends of the brackets 8. For the sake of clearness, these braces are broken away in Fig. 3.

It will be readily noted from the foregoing description, taken in connection with the accompanying drawings, that I have provided an apparatus in which the cultivator disks may be readily set to penetrate the ground to any desired depth and may be also adjusted to any desired distance apart while each pair of disks is also adjustable toward and from the pole or draft bar so that they may be readily set to correspond to the widths of the rows. The draft is applied directly to the axle of the machine so that the machine will be drawn forward positively and side draft practically eliminated. The construction and arrangement of parts is such that the machine may be produced at a low cost and will possess the requisite strength without unnecessary weight.

Having thus described the invention, what is claimed as new is:

1. The combination of a main frame comprising a pole and a cross bar secured thereto, a slide supported on the under side of said cross bar near the end thereof and provided with longitudinally projecting trunnions at its ends, a cultivator frame consisting of side bars having upturned front ends pivotally engaged on said trunnions, means supported on the main frame for raising and lowering the rear end of the cultivator frame, and means on the main frame connected with the cultivator frame for shifting the cultivator frame laterally of the main frame.

2. The combination of a main frame comprising a cross bar and a pole, cultivator frames having their front ends slidably supported upon the under side of said cross bar at opposite sides of the pole, angle levers pivotally mounted upon the pole in rear of said cross bar and each having one arm projecting forwardly and another arm projecting laterally, operating levers supported by the pole in rear of the angle levers, links each connecting and operating the lever with the laterally projecting arm of one of the angle levers, and links each connecting the forwardly projecting arm of one of said levers with the front end of a cultivator frame.

3. The combination of a main frame, cultivator frames supported thereon and comprising side bars, means connected with the rear ends of the side bars for vertically adjusting the same, cross bars secured across the said side bars and adjustable along the same, and means for attaching ground engaging members to said cross bars laterally, beyond the side bars.

4. The combination of a main frame comprising a cross bar, a cultivator frame having its front end pivotally and slidably supported on the under side of said cross bar, soil turning instrumentalities carried by the cultivator frame, means mounted on the main frame and connected with the front end of the cultivator frame for sliding the same laterally, and means mounted on the main frame and connected with the rear end of the cultivator frame for raising and lowering the same.

5. The combination of a frame consisting of parallel side bars, a cross bar extending over and resting on said side bars, hooks engaging under the said side bars and extending upwardly through the cross bar, means for securing said hooks in the cross bar, standards having their upper ends bearing against the under side of the cross bar, means engaging the upper ends of the standards to secure them to the cross bar, and soil turning members carried by said standards.

6. The combination of a frame consisting of parallel side bars, a cross bar extending over and resting on said side bars, means for securing the cross bar to said side bars and adjusting said cross bar longitudinally of the side bars, the ends of the cross bar projecting laterally beyond the side bars, standards provided at their upper ends with laterally projecting flanges bearing against the under side of the cross bar beyond the side bars, soil turning members carried by said standards, plates extending over and resting on the cross bar above the lateral flanges of the standards, and securing devices inserted through the ends of said plates and through the ends of the subjacent flanges.

In testimony whereof I affix my signature.

CHARLES H. CLARK.

Copies of this patent may be obtained for five cents each, by addressing the "Commissioner of Patents, Washington, D. C."